United States Patent [19]

Tokiwa et al.

[11] 3,977,988

[45] Aug. 31, 1976

[54] STABILIZED SODIUM PERCARBONATE AND PROCESS FOR PREPARING SAME

[75] Inventors: Fumikatsu Tokiwa, Sakura; Takehiko Kobayashi, Zushi, both of Japan

[73] Assignee: Kao Soap Co., Ltd., Tokyo, Japan

[22] Filed: Mar. 13, 1975

[21] Appl. No.: 557,958

[30] Foreign Application Priority Data

Mar. 23, 1974 Japan.............................. 49-32903

[52] U.S. Cl................................ 252/99; 252/103; 252/186; 427/215

[51] Int. Cl.²...................... C11D 7/18; C11D 7/38

[58] Field of Search..................... 252/99, 103, 186; 427/215

[56] References Cited

UNITED STATES PATENTS

| | | | |
|---|---|---|---|
| 2,308,992 | 1/1943 | Mertens | 252/99 |
| 3,167,513 | 1/1965 | Embden | 252/99 |

*Primary Examiner*—Mayer Weinblatt
*Assistant Examiner*—Edith R. Buffalow
*Attorney, Agent, or Firm*—Woodhams, Blanchard and Flynn

[57] ABSTRACT

A process for preparing stable sodium percarbonate, by coating sodium percarbonate with a mixture of a silicate and a silicofluoride.

10 Claims, No Drawings

STABILIZED SODIUM PERCARBONATE AND PROCESS FOR PREPARING SAME

BACKGROUND OF THE INVENTION

Field of the Invention

This invention relates to a process for treating sodium percarbonate to increase its shelf life.

Description of the Prior Art

Sodium percarbonate is a known substance useful as a bleaching agent or oxidizing agent. Sodium percarbonate ranks with sodium perborate as a typical oxygen-type bleaching agent for domestic and commercial clothes washing purposes. Sodium percarbonate is represented by the formula: $2Na_2CO_3.3H_2O_2$. It is generally prepared by reacting sodium carbonate with hydrogen peroxide.

In comparison with chlorine-type bleaching agents, sodium percarbonate is somewhat inferior in bleaching power at ambient temperature of about 20° to 25°C. However, sodium percarbonate has the advantages that it can be applied to synthetic fibers, animal fibers, resin-finished fibers and fibers treated with fluorescent brightening agents without causing yellow staining and it does not harm the fibers. Further, a sufficient bleaching effect can be obtained if sodium percarbonate is used at an elevated temperature or if it is used together with a decomposition promotor. Accordingly, sodium percarbonate has been used as a domestic and commercial bleaching agent.

The reasons why sodium percarbonate is attracting increased attention as a domestic bleaching agent and as a component of general purpose clothes washing detergents are that the decomposition products thereof do not cause environmental pollution and that it can be used easily and safely in various application forms.

However, in comparison with sodium perborate, sodium carbonate has the serious disadvantage that its shelf life is far shorter and the available oxygen therein is reduced rapidly. Due to its high compatibility with water, the surfaces of sodium percarbonate particles become moist or absorb water, even in a very low humidity atmosphere, whereby it is decomposed. In the presence of an ion such as iron, copper, manganese or cobalt ion, the decomposition thereof is further promoted. Thus, sodium percarbonate is inferior to sodium perborate with respect to stability.

If sodium percarbonate is stored by itself in a closed vessel, it exhibits a stability during the storage equivalent to that of sodium perborate. However, if sodium percarbonate is mixed with a detergent or placed in an open vessel, its shelf life is reduced due to the high hygroscopicity thereof, even though it has a high solubility.

Another disadvantage of sodium percarbonate is that particles of it adhere together to form aggregates or cakes if it is stored in the form of a powder. This phenomenon poses a practical problem when sodium percarbonate is to be used in the form of a powder.

In view of the circumstances described above, it is desired to provide sodium percarbonate which does not decompose or solidify into masses even if it is stored in an open vessel and which has adequate shelf life even if it is mixed with detergent or bleaching compositions.

As one process for stabilizing sodium percarbonate, there has been proposed a process wherein sodium percarbonate is coated with a paraffin or polyethylene glycol having a molecular weight of 3,000 to 8,000. However, by coating with paraffin, the solubility of sodium percarbonate in water is reduced remarkably and, therefore, this is impractical. The coating with polyethylene glycol is not effective for stabilization for a long time period due to the considerable hygroscopicity of polyethylene glycol per se, even though the coated product is water-soluble. There has been proposed another process wherein at least two stabilizers selected from the group consisting of phosphates, silicates, ethylenediamine tetraacetate (EDTA) and nitrilo triacetate (NTA) are incorporated in the aqueous hydrogen peroxide solution used in the preparation of sodium percarbonate. However, those substances have no practical stabilizing effect for sodium percarbonate in the presence of water or when mixed with a detergent, even though they are effective for reducing heat decomposition. Another process comprises coating sodium percarbonate uniformly with sodium pyrophosphate. This process is also insufficient with respect to its stabilizing effect on sodium percarbonate in water or in a detergent, even though the heat decomposition rate is reduced.

SUMMARY OF THE INVENTION

The object of this invention is to provide sodium percarbonate which is stable, both when it is stored by itself and also when it is stored together with detergent compositions or decomposition promotor.

The object of the present invention is attained by coating sodium percarbonate with a mixture of a silicate and a silicofluoride.

As the silicates, there can be used alkali metal silicates such as sodium and potassium silicates and alkaline earth metal silicates such as magnesium, calcium and barium silicates. The silicate of this invention is represented by the formula: $Me_2O.xSiO_2$ when Me is an alkali metal or by the formula: $MeO.xSiO_2$ when Me is an alkaline earth metal, wherein $x$ is generally from 0.5 to 4. As the silicate of this invention, there can be used a metasilicate ($Me_2O.SiO_2$), an ortho-silicate ($2Me_2O.SiO_2$), sodium disilicate ($Na_2O.2SiO_2$) and sodium tetrasilicate ($Na_2O.4SiO_2$). Sodium silicates ($Na_2O.xSiO_2$, wherein $x$ is 3 to 5 ) of Japanese Industrial Standard K 1408-1966, Nos. 1, 2 and 3 are preferred. Among them, sodium silicate No. 3 is especially preferred. In sodium silicate corresponding to Japanese Industrial Standard K 1408-1966, No. 1, $x$ is 2.1, in No. 2, $x$ is 2.5 and in No. 3, $x$ is 3.1.

As the silicofluorides (fluosilicates), there can be used alkali metal silicofluorides such as sodium and potassium silicofluorides and alkaline earth metal silicofluorides such as magnesium and calcium silicofluorides. Among them, sodium silicofluoride ($Na_2SiF_6$) is preferred.

In carrying out the present invention, the weight ratio of the silicate to the silicofluoride is in the range of from 1:1 to 10:1, preferably from 3:1 to 6:1, parts by weight.

The viscosity of the mixture of silicate and silicofluoride varies widely depending on the weight ratio of those substances. Accordingly, in coating sodium percarbonate with the mixture of silicate and silicofluoride, the mixture is diluted with water to give a practical concentration and viscosity suitable for application to the sodium percarbonate, such as by spraying. The quantity of water used for the dilution is optional.

The amount of the mixture of the silicate and silicofluoride applied to the sodium carbonate is 3 to 20 wt. %, on a water-free basis, based on the weight of sodium percarbonate. A particularly perferred effect is obtained when 7 to 10 wt.% of the mixture (water-free basis) is applied.

In coating sodium percarbonate with the stabilizer composition, according to the present invention, previously granulated sodium percarbonate is coated with the stabilizer composition and then dried, or sodium percarbonate is mixed with the stabilizer composition and then granulated and dried.

The mechanism of the stabilizing effect of the hygroscopicity of silicate and silicofluoride on sodium percarbonate is believed to be that, by mixing the silicofluoride with silicate, the silicate becomes substantially non-hygroscopic and it forms a water-insoluble glassy film on the sodium percarbonate particles at a pH below 9, which film prevents sodium percarbonate from being affected by water or harmful metal ions. If the silicate is used alone, it reacts with carbon dioxide contained in air to form a glassy film, but this film is not effective for stabilizing purposes, because it has a high hygroscopcity and it is soluble in water at any pH value. On the other hand, the glassy film comprising the mixture of silicate and silicofluoride has the above described properties and, in addition, it is easily soluble in water when it is used in the form of a mixture with an alkaline detergent, since the pH value of this mixture in aqueous solution is above 9.5. In general the treated sodium percarbonate, according to the invention, can be mixed with conventional alkaline clothes washing detergent compositions in an amount in the range of from 1 to 30 weight percent, based on the total weight of the mixture.

The present invention will be further described by reference to the following illustrative example.

EXAMPLE 1,000 Grams of sodium percarbonate were charged into a mixer. The mixer was rotated while the temperature thereof was kept at 25°C and an aqueous solution of a mixture of No. 3 sodium silicate and sodium silicofluoride was sprayed to coat the surfaces of the sodium percarbonate particles. Stirring was continued for about 30 to 40 minutes to form a glassy film consisting of a mixture of No. 3 sodium silicate and sodium silicofluoride on the surface of the sodium percarbonate particles.

The product was then dried in air at 80°C in a fluidized bed-type drying machine.

For comparison, samples of sodium percarbonate were respectively treated in the same manner with an aqueous solution of either No. 3 sodium silicate alone and sodium silicofluoride alone.

The aqueous solutions employed had the following compositions:

|  | Run No. | Water | No. 3 Sodium silicate | Sodium silicofluoride |
|---|---|---|---|---|
|  | 1 | 100 g | 100 g | 50 g |
| Example | 2 | 100 g | 100 g | 25 g |
|  | 3 | 100 g | 100 g | 20 g |
| Comparative Example | 4 | 100 g | 130 g | — |
|  | 5 | 100 g | — | 130 g |

The thus-obtained stabilized sodium percarbonates (products of the present invention), the control sodium percarbonates and the non-treated sodium percarbonate were respectively mixed with a commercial detergent in a weight ratio of 1:9. The mixtures were allowed to stand in a room at 40°C, 80% RH, for 15 days. The amounts of remaining available oxygen were measured and the results shown below were obtained.

|  | Run No. | Amount of remaining available oxygen (% of original amount) |
|---|---|---|
| Present invention | 1 | 59.2 |
|  | 2 | 60.5 |
|  | 3 | 58.6 |
| Control | 4 | 20.3 |
|  | 5 | 9.9 |
| Non-treated |  | 10.1 |

The embodiments of the invention in which an exclusive property of privilege is claimed are defined as follows:

1. Sodium percarbonate coated with from 3 to 20 weight percent of a film consisting essentially of a mixture of a silicate and a silicofluoride, wherein the weight ratio of silicate : silicofluoride is in the range of 1:1 to 10:1, and
   wherein said silicate is selected from the group consisting of alkali metal silicates and alkaline earth metal silicates, and wherein said silicofluoride is selected from the group consisting of alkali metal silicofluorides and alkaline earth metal silicofluorides.

2. A composition as claimed in claim 1 wherein said alkali metal silicate has the formula $Me_2O \cdot XSiO_2$, and said alkaline earth metal silicate has the formula $Me'O \cdot XSiO_2$, wherein Me is an alkali metal, Me' is an alkaline earth metal and X is from 0.5 to 4.

3. A composition as claimed in claim 1, in which said silicate is sodium silicate having the formula $Na_2O \cdot XSiO_2$ wherein X is 2.1, 2.5 or 3.1.

4. A composition as claimed in claim 3 in which X is 3.1.

5. A composition as claimed in claim 1 in which said silicofluoride is selected from the group consisting of sodium silicofluoride, potassium silicofluoride, magnesium silicofluoride and calcium silicofluoride.

6. A composition as claimed in claim 1, in which the weight ratio of silicate:silicofluoride is in the range of 3:1 to 6.1.

7. A composition as claimed in claim 1, in which the weight of said film is from 7 to 10 weight percent, based on the weight of sodium percarbonate.

8. A composition as claimed in claim 1, in which the silicate is sodium silicate and the silicofluoride is sodium silicofluoride.

9. An alkaline detergent composition containing from 1 to 30 percent by weight of the composition of claim 1.

10. A process for preparing stabilized sodium percarbonate which comprises applying to particles of sodium percarbonate an aqueous solution of a mixture of a silicate selected from the group consisting of alkali metal silicates and alkaline earth metal silicates and a silicofluoride selected from the group consisting of alkali metal silicofluorides and alkaline earth metal silicofluorides, wherein the weight ratio of silicate : silicofluoride is in the range of 1:1 to 10:1, to form a coating film of from 3 to 20 weight percent of a mixture of said silicate and said silicofluoride on the particles and then drying the film.

* * * * *